No. 791,510. PATENTED JUNE 6, 1905.
A. L. SONN.
BRUSH.
APPLICATION FILED DEC. 12, 1902.

Witnesses:
Dudley B. Wade
Lottie Prior

Anson L. Sonn
Inventor:
By Waid & Cameron
Attorneys

No. 791,510. Patented June 6, 1905.

UNITED STATES PATENT OFFICE.

ANSON L. SONN, OF TROY, NEW YORK.

BRUSH.

SPECIFICATION forming part of Letters Patent No. 791,510, dated June 6, 1905.

Application filed December 12, 1902. Serial No. 134,904.

*To all whom it may concern:*

Be it known that I, ANSON L. SONN, a citizen of the United States of America, and a resident of the city of Troy, county of Rensselaer, and State of New York, (having a post-office address at Lansingburg station, Troy, New York,) have invented certain new and useful Improvements in Brushes, of which the following is a specification.

My invention relates to improvements in brushes.

The object of my invention is to provide a brush in which the bristle tufts are at one of their ends secured within a cement or a composition, which cement or composition is when warm and plastic entered within a recess formed in the brush-back.

I attain this object by means of the mechanism illustrated in the accompanying drawings, in which—

Figure 1:
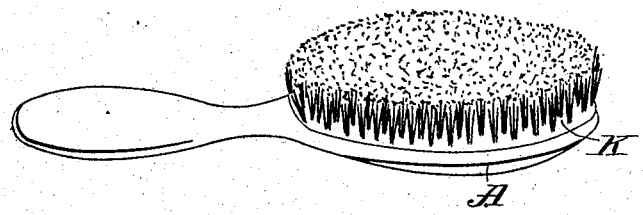
Figure 2:
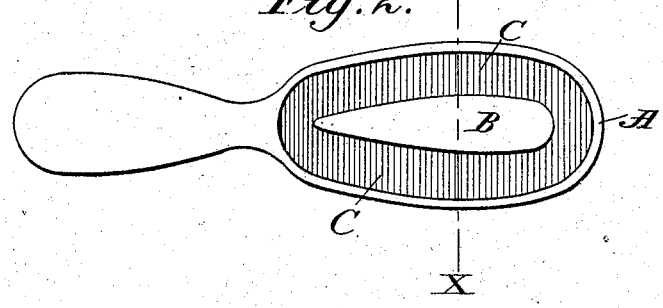
Figure 3:
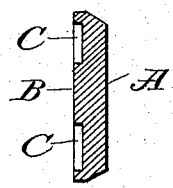

Figure 1 is a perspective view of a brush containing my invention. Fig. 2 is a plan of a brush-back before the cement or composition is placed therein. Fig. 3 is a section along the line X X on Fig. 2.

Similar letters refer to similar parts throughout the several views.

For the purpose of retaining the bristles of a brush in position a composition or cement has heretofore been used with bristles extending into the cement and the cement placed in a brush-back.

My invention is to provide a new and more effectual means for retaining the cement in the brush-back and at the same time make the completed brush lighter in weight than has heretofore been accomplished, so far as I am aware, in cement or composition brushes. The cement or composition is heavier than the wood, which is the material of which the brush-back is usually constructed. Therefore it is desirable to have as little composition as is consistent with good construction.

I preferably arrange a brush-back A (shown in Fig. 2) in which a portion C is cut out, leaving a central part B of substantially the same thickness as the brush-back, thus forming a groove C in the brush-back, extending around the sides of the brush-back. Within the groove C and over the portion B the plastic cement or composition will extend and will retain in position the pad of cement or composition K containing the bristles when the same has become hardened.

As a hair-brush is preferably arranged with the bristles at the center, protruding farther from the brush-back than at the edges, the raised portion B will not interfere with the proper contour of the ends of the bristles when cemented into the brush-back. As the cement or composition K is placed within the groove C in a softened and heated condition, after remaining therein a very short time the cement or composition will harden, and being pressed tightly within the groove the cement or composition clings to the edges and bottom of the groove and the top portion of raised portion B and holds the bristles firmly and positively in position.

What I claim as my invention, and desire to secure by Letters Patent, is—

In a brush the combination of a composition; bristles secured to said composition; a brush-back provided with a raised center portion; a groove between said center portion and a ridge along the rim of the brush-back; said composition secured within said groove, substantially as described.

Signed by me at Lansingburg, Troy, New York, this 3d day of December, 1902.

ANSON L. SONN.

Witnesses:
GEORGE DORFNER,
MILFORD L. FANCHER.